United States Patent
Hammond et al.

[19]

[11] Patent Number: 5,992,140
[45] Date of Patent: Nov. 30, 1999

[54] EXHAUST NOZZLE FOR SUPPRESSING INFRARED RADIATION

[75] Inventors: Mark H. Hammond, Southington, Conn.; Walter M. Presz, Jr., Wilbraham, Mass.

[73] Assignee: Sikorsky Aircraft Corporation, Stratford, Conn.

[21] Appl. No.: 08/881,344

[22] Filed: Jun. 24, 1997

[51] Int. Cl.$^6$ .................................................... F02K 1/48
[52] U.S. Cl. ..................... 60/262; 60/39.5; 239/265.17
[58] Field of Search ........................... 20/39.5, 262, 266; 239/265.17

[56] References Cited

U.S. PATENT DOCUMENTS

| | | | |
|---|---|---|---|
| 2,390,161 | 12/1945 | Mercier | 60/35.6 |
| 3,048,376 | 8/1962 | Howald et al. . | |
| 3,084,505 | 4/1963 | Cherchi . | |
| 3,212,700 | 10/1965 | Guienne et al. | 230/103 |
| 3,685,612 | 8/1972 | Bertin | 181/33 HC |
| 3,710,890 | 1/1973 | True et al. | 181/33 HC |
| 3,739,984 | 6/1973 | Tontini | 239/265.17 |
| 3,921,906 | 11/1975 | Nye et al. | 239/127.3 |
| 3,926,373 | 12/1975 | Viets | 239/265.17 |
| 3,981,448 | 9/1976 | Demogenes et al. | 239/127.3 |
| 4,007,587 | 2/1977 | Banthin et al. | 60/204 |
| 4,018,046 | 4/1977 | Hurley | 60/264 |
| 4,095,417 | 6/1978 | Banthin | 60/39.5 |
| 4,198,817 | 4/1980 | Fujita et al. | 60/319 |
| 4,215,537 | 8/1980 | Hurley | 60/264 |
| 4,312,480 | 1/1982 | Miller | 239/127.3 |
| 4,401,269 | 8/1983 | Eiler | 239/265.17 |
| 4,487,017 | 12/1984 | Rodgers | 239/265.17 |
| 4,800,715 | 1/1989 | Conway | 60/39.5 |
| 4,830,315 | 5/1989 | Presz, Jr. et al. | 244/200 |
| 4,835,961 | 6/1989 | Presz, Jr. et al. | 60/264 |
| 5,440,875 | 8/1995 | Torkelson et al. | 60/226.1 |
| 5,761,900 | 6/1998 | Presz, Jr. | 60/262 |

FOREIGN PATENT DOCUMENTS

| | | |
|---|---|---|
| 0 761 956 | 3/1997 | European Pat. Off. . |
| 2 515 735 | 5/1983 | France . |
| 3129305 C2 | 1/1989 | Germany . |
| 2 119 859 | 11/1983 | United Kingdom . |
| 2 160 265 | 12/1985 | United Kingdom . |
| 2 263 505 | 7/1993 | United Kingdom . |

*Primary Examiner*—Louis J. Casaregola
*Attorney, Agent, or Firm*—Brian A. Collins

[57] ABSTRACT

An exhaust nozzle (24 or 28) operative to suppress the InfraRed (IR) signature radiated from the high-temperature exhaust of an engine (12) which exhaust nozzle (24 or 28) includes an inlet conduit adapted for receiving the high-temperature engine exhaust and a plurality of adjoined lobes (30) integrally formed in combination with the inlet conduit. The adjoined lobes (30) are characterized by a first and second plurality of penetrating lobes (60, 62 or 70, 72) which are adapted for admixing low-temperature gaseous fluid with the high-temperature exhaust and which are axially staggered with respect to each other. In the preferred embodiment, at least one of said plurality of penetrating lobes (60 or 62, 70 or 72) extends into a core region (CR) of the exhaust nozzle (24 or 28) to effect thorough mixing of the engine exhaust with the low temperature gaseous fluid. Various embodiments of such exhaust nozzle (24 or 28) are described in the context of a multi-stage mixer/ejector (20).

5 Claims, 6 Drawing Sheets

EXHAUST NOZZLE FOR SUPPRESSING INFRARED RADIATION

RELATED APPLICATIONS

This invention is related to co-pending, commonly-owned, U.S. patent application entitled "Multi-stage Mixer/Ejector for Suppressing Infrared Radiation", Ser. No. 08/881,191.

TECHNICAL FIELD

This invention is directed to engine exhaust nozzles, and more particularly, to an engine exhaust nozzle operative to suppress the infrared signature radiated by the exhaust plume of an engine and/or the various hot metal components thereof.

BACKGROUND OF THE INVENTION

The exhaust plume of gas turbine engines, e.g., military aircraft engines, is a source of high infrared energy which may be used for targeting/tracking purposes by heat seeking missiles and/or various forms of infrared imaging systems, e.g., Night Vision Goggles (NVGs). With respect to the former, heat seeking missiles obtain directional cues from the infrared energy, which directional cues are more precise depending upon the intensity, e.g., temperature, and total energy emitted by the exhaust plume. Regarding the latter, infrared imaging systems amplify the infrared energy by a factor of about 10,000 and may be used by hostile forces for early detection and/or targeting of surface-to-air/air-to-air missiles. Accordingly, it is highly desirable to reduce the infrared emissions (also referred to as the IR signature) of such engines to a practical minimum to avoid detection, acquisition and/or tracking by enemy threats/forces.

Various infrared suppression systems have been designed and fielded which effect mixing of low temperature ambient air with the high temperature engine exhaust to reduce the IR signature radiated therefrom. Generally, it is the principle objectives of such systems to: (a) reduce the infrared energy below a threshold level (e.g., a level capable of being sensed by the perceived threat), (b) maintain engine performance, and, (c) minimize the weight penalties associated therewith. Secondary objectives may include: (i) minimizing system or configuration complexity to reduce fabrication costs, (ii) minimizing the external aerodynamic drag produced by such IR suppressors, and/or (iii) suppressing the acoustic emissions emanating therefrom which may also be a source of detection.

Hurley U.S. Pat. No. 4,018,046 discloses an InfraRed (IR) suppressor for reducing the infrared radiation emitted from the exhaust plume and/or hot metal parts of a gas turbine engine. The IR suppressor includes an ejector vane assembly which is adapted for receiving a primary flow of engine exhaust and which is operative to entrain a first flow of cooling air into the primary exhaust flow. The primary flow of gases diffused from and entrained by the ejector vane assembly are fed into an arcuate duct which, due to its spatial position relative to the ejector vane assembly, produces an annular space for entraining a second flow of cooling air. The first and second flows are admixed with the primary exhaust flow to effect heat transfer therebetween and, consequently, to suppress the IR signature emitted from the exhaust plume. Additionally, the curved shape of the arcuate duct and/or the use of turning vanes disposed internally thereof, serve to prevent direct line-of-sight viewing into the IR suppressor. That is, the shape prevents viewing of radiant energy emitted by hot internal components such as from the ejector vane assembly or from the turbine section of the engine.

The ejector vane assembly described therein includes a plurality of V-shaped ejector vanes which entrain cooling air at a plurality of angularly spaced positions while additionally serving to introduce air toward the center of the engine exhaust. More specifically, each of the ejector vanes forms a V-shaped channel which is open to ambient air at one end thereof and is oriented to direct flow radially toward the core of the primary exhaust flow. The ejector vane assembly, furthermore, clusters the ejector vanes as close as practicable to the core of the primary exhaust flow and, furthermore, includes a means for adjusting the flow area through the ejector vanes to ameliorate engine performance. That is, the adjustment means effects collapse of each ejector vane so as to increase the flow area and reduce the back-pressure on the engine.

While the ejector vane assembly improves mixing, i.e., reduces the IR signature, by directing cooling air into a core region of the engine exhaust, it will be appreciated that the ejector vane assembly requires a large number of individual components. As such, the multiplicity of components, each being a potential source of repair and maintenance, reduces the overall reliability of the IR suppressor system. Furthermore, while the adjustment means attempts to reduce flow restriction, the anticipated power loss produced by the ejector vane assembly is on the order of between 3% to 6%. In view of the fact that even small variations in efficiency, i.e., on the order of ½% to 1%, have significant impact on engine performance, such power loss may be viewed as intolerable for certain aircraft and/or aircraft missions wherein maximum gross weight, flight speed, and range are critical design parameters. Moreover, while the IR suppressor employs a simple ejector principle to suppress infrared radiation, it will be appreciated that the manufacture of such IR suppressor, particularly the ejector vane assembly, is highly complex and requires multiple forming, machining, welding, and assembly operations.

Presz et al. U.S. Pat. Nos. 4,835,961 and 4,830,315 describe nozzle configurations for mixing/pumping fluid. More specifically, the Presz '961 and '315 patents describe single and multi-stage mixer/ejector nozzles, respectively, each having a plurality of adjoined lobes formed at an outlet end thereof. The adjoined lobes define a primary flow trough for channeling a primary flow of high velocity/energy fluid, such as the exhaust of a gas turbine engine, and a secondary flow trough for channeling a secondary flow of low velocity/energy fluid such as ambient air. The primary and secondary flow troughs are alternately disposed about the periphery of the nozzle such that thin sheets of high energy fluid flow from the trough outlets, transfer kinetic energy to the low energy fluid, and entrain the secondary flow into the primary flow. Aside from simple viscous or shear mixing, the adjoined lobes produce axial vortices which rapidly admix the primary and secondary flows. As such, the adjoined lobes described in the Presz '961 and '315 patents are known to have utility on aircraft engines to both increase thrust and for suppressing the thermal energy radiated from the engine.

While the adjoined lobes serve to rapidly admix primary and secondary flows to reduce the IR signature, the nozzle configurations disclosed therein fail to fully mix the flows, particularly in the core region of the primary exhaust flow. That is, in all of the embodiments described therein, the lobes entrain the secondary cooling flow into a perimeter region of the flow such that a central core or band of high temperature exhaust remains as the flow exits the nozzle.

While the core of high temperature flow will eventually admix downstream, it will be appreciated that the degree of IR suppression is compromised until such energy is diffused.

A need, therefore exits, for providing an engine exhaust nozzle which maintains or improves engine performance, rapidly and thoroughly diffuses the IR energy emitted/radiated from a gas turbine engine, and facilitates fabrication via conventional, low-cost, manufacturing methods.

SUMMARY OF THE INVENTION

It is an object of the present invention to provide an engine exhaust nozzle for suppressing the InfraRed (IR) radiation emitted by the exhaust plume and/or the hot metal components of an engine while maintaining or improving engine performance.

It is another object of the present invention to provide such an engine exhaust nozzle which is adapted for entraining a secondary flow of low temperature gaseous fluid into a core region of the primary engine exhaust.

It is yet another object of the present invention to provide such an engine exhaust nozzle which is readily fabricated by conventional, low-cost, manufacturing methods.

It is yet a further object of the present invention to provide such an engine exhaust nozzle wherein the nozzle geometry prevents direct line-of-sight viewing internally of the nozzle.

These and other objects of the present invention are achieved by an exhaust nozzle operative to suppress the InfraRed (IR) signature radiated from the high-temperature exhaust of an engine, which exhaust nozzle includes an inlet conduit adapted for receiving the high-temperature engine exhaust and a plurality of adjoined lobes integrally formed in combination with the inlet conduit. The adjoined lobes are characterized by a first and second plurality of penetrating lobes which are axially staggered with respect to each other and which are adapted for admixing low-temperature gaseous fluid with the high-temperature exhaust. In the preferred embodiment, at least one of the plurality of penetrating lobes extends into a core region of the exhaust nozzle to effect thorough mixing of the low temperature gaseous fluid with the engine exhaust. Various embodiments of such exhaust nozzle are described in the context of a multi-stage mixer/ejector.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

The exemplary embodiments of the present invention will be described in the context of a helicopter gas turbine engine, though, it will be appreciated that the teachings described herein are applicable to any turbo-shaft engine wherein the maximization of shaft horsepower is a principle design objective. This application is to be distinguished from other engine designs, such as turbo-jet or turbo-fan engines, wherein the maximization of thrust, rather than shaft horsepower, is a key design objective. Furthermore, the invention will be described in the context of a multi-stage mixer/ejector having tandemly-arranged first and second stage exhaust nozzles for suppressing the IR signature radiated from such turbo-shaft engine. It should be appreciated, however, that each exhaust nozzle is configured in accordance with the teachings of the present invention and, therefore, is operative alone or in conjunction with other nozzle configurations known in the art. Accordingly, the teachings are broadly applicable to infrared mixer/ejectors, exhaust nozzles, and/or exhaust nozzles for use in single or multi-stage mixer/ejectors. Finally, while the present invention describes such a multi-stage mixer/ejector wherein one such exhaust nozzle employs a bend therein for preventing direct line-of-sight viewing into the gas turbine section of the engine, the teachings are also applicable to in-line ejector configurations.

Figure 1:
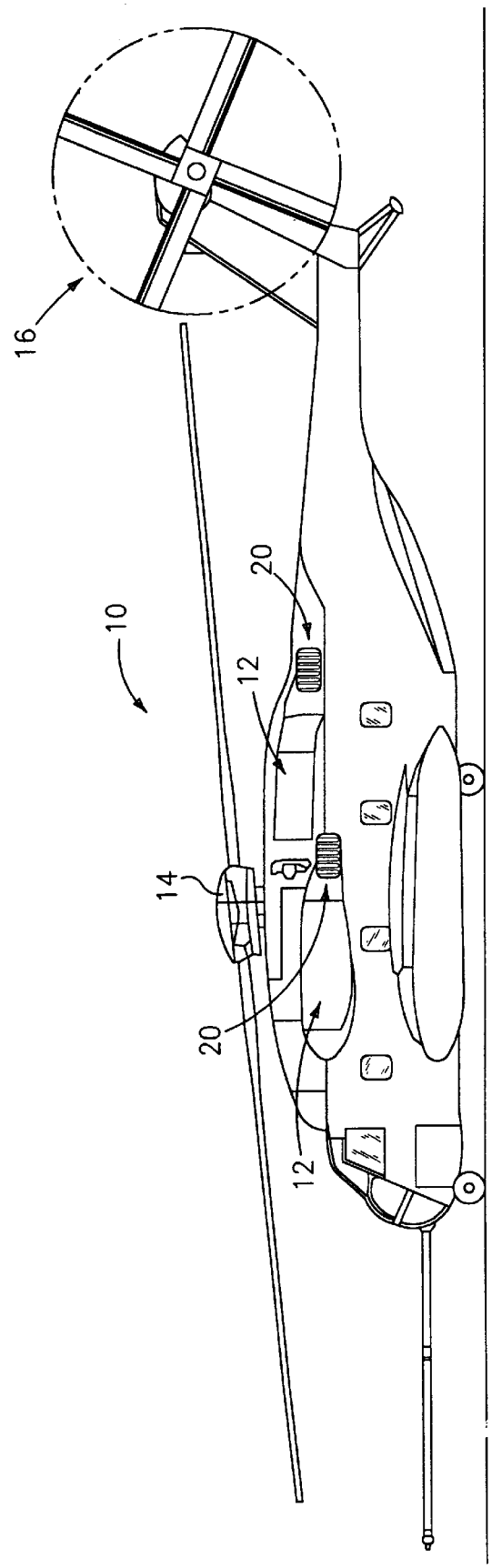
FIG. 1 is a profile view of a helicopter illustrating an exemplary installation of a multi-stage mixer/ejector which employs exhaust nozzles according to the present invention.

Referring now to the drawings wherein like reference characters identify corresponding or similar elements throughout the several views, FIG. 1 shows a helicopter 10 having one or more gas turbine engines 12 for driving a main and tail rotor, 14 and 16, respectively. A multi-stage mixer/ejector 20 is disposed in combination with the aft end of each gas turbine engine 12 and is operative to suppress the InfraRed (IR) signature radiated from the high-temperature exhaust of the respective engine 12. In the context used herein, "to suppress" means that the IR signature emanating from the gas turbine engine 12 is reduced below some predetermined threshold value which is indicative of the acquisition, tracking and/or targeting capability of a particular IR threat.

Figure 2:
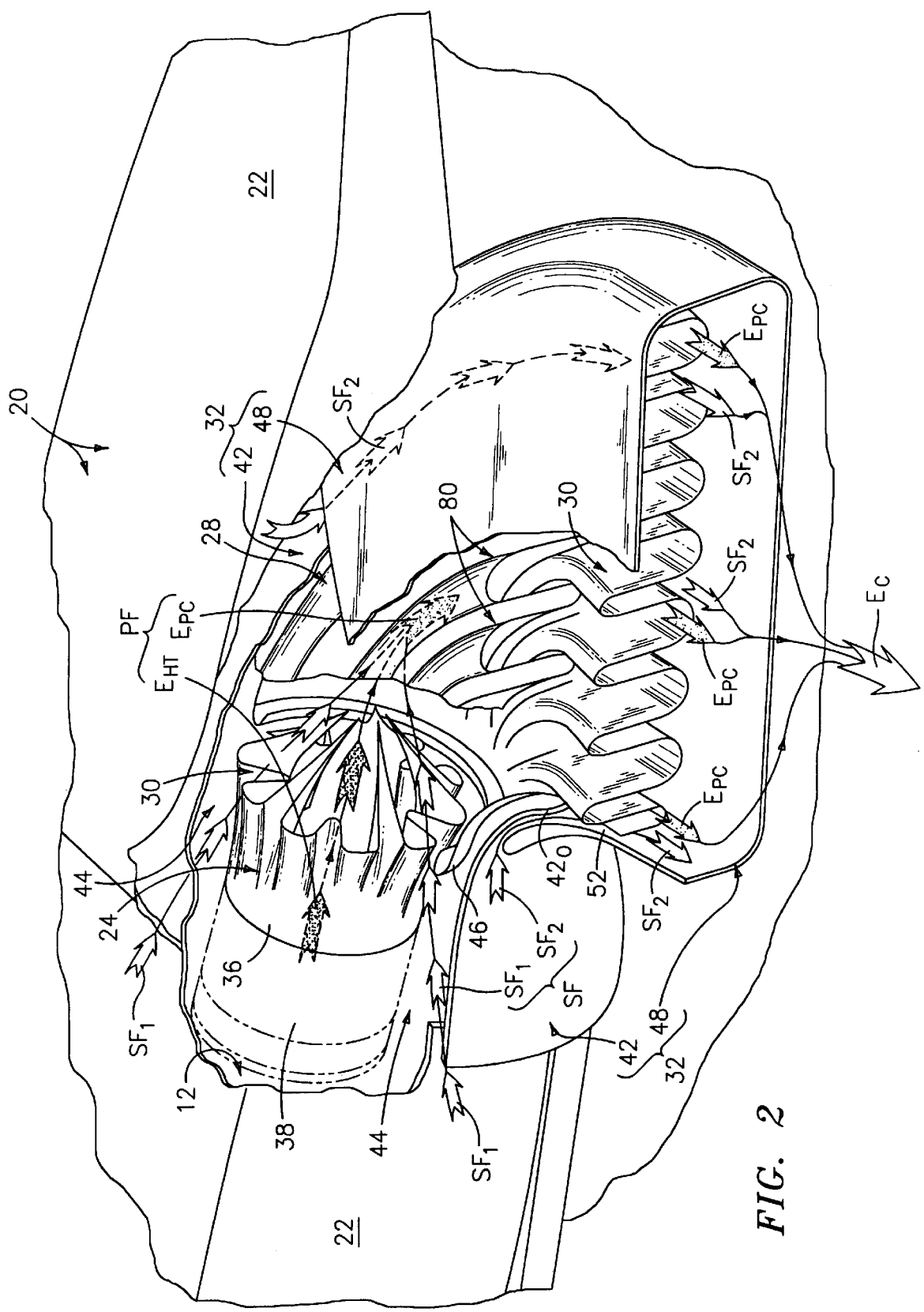
FIG. 2 is a partially broken-away perspective view of a multi-stage mixer/ejector disposed in combination with the aft end of a gas turbine engine, which multi-stage mixer/ejector includes tandemly-arranged first and second stage exhaust nozzles, wherein each exhaust nozzle is configured in accordance with the teachings of the present invention.

In FIG. 2, a perspective view of the multi-stage mixer/ejector 20 is shown in combination with the engine 12 and in position relative to the helicopter fuselage 22. Before discussing each element and/or feature of the multi-stage mixer/ejector 20 in detail, a brief overview of the major components and the operation of each will be provided. The multi-stage mixer/ejector 20 comprises tandemly-arranged first and second stage exhaust nozzles 24 and 28, respectively, each having a plurality of adjoined lobes 30, and a shroud means 32 for enveloping the adjoined lobes 30 of each exhaust nozzle. Each of the first and second stage exhaust nozzles 24, 28 is adapted for receiving a primary flow PF of engine exhaust, for diffusing the primary flow PF though the respective adjoined lobes 30, and for entraining a secondary flow SF of low temperature gaseous fluid, e.g., ambient air, into the primary flow PF. More specifically, the effluent primary flow PF entrains the secondary flow SF through flow passages (discussed below) defined by the shroud means 32. Accordingly, in the described embodiment, the multi-stage mixer/ejector 20 entrains two secondary flows SF, i.e., a first flow $SF_1$ directed toward the exit plane of the first stage exhaust nozzle 24, and a second flow $SF_2$ directed toward the exit plane of the second stage exhaust nozzle 28. The fluid dynamics principle for entraining such secondary flows $SF_1$, $SF_2$ is well-known in the art and is often referred to as a "venturi effect".

In the described embodiment, an inlet conduit 36 of the first stage exhaust nozzle 24 is disposed in combination with the exhaust casing 38 of the engine 12 for receiving the primary upstream flow PF of high temperature engine exhaust $E_{HT}$. The primary upstream flow PF of high temperature engine exhaust $E_{HT}$ is diffused and admixed with the secondary flow $SF_1$ via the adjoined lobes 30. The shroud means 32 includes a first stage shroud 42 which generally complements the shape of the first stage exhaust nozzle 24 and which defines a generally annular passage 44 for channeling the respective secondary flow $SF_1$. The adjoined lobes 30 of the first stage exhaust nozzle 24 incorporate several inventive features which serve to ameliorate the fluid dynamics/mixing of the primary and secondary flows PF, $SF_1$. While these and other features of the first stage exhaust nozzle 24 will be discussed in greater detail below, suffice it to say at this point in the description, that the primary and secondary flows PF, $SF_1$ admix to produce a primary midstream flow PF of partially-cooled exhaust $E_{PC}$.

An inlet conduit 46 of the second stage exhaust nozzle 28 is disposed proximal to the adjoined lobes 30 of the first stage nozzle 24 and is adapted to receive the primary midstream flow PF of partially-cooled exhaust $E_{PC}$. In the described embodiment, the inlet conduit 46 defines a substantially circular opening of sufficient size to envelope the first stage adjoined lobes 30 and, as such, functions in combination with the shroud means 32 to entrain the secondary flow $SF_1$. The resultant partially cooled exhaust $E_{PC}$ is diffused and admixed with the secondary flow $SF_2$ by the adjoined lobes 30 of the second stage nozzle 28. The shroud means 32 includes a second stage shroud 48 which generally complements the shape of the second stage adjoined lobes 30 and which defines a generally tubular passage 52 for channeling the respective secondary flow $SF_2$. Furthermore, in the described embodiment, the second stage shroud 48 envelopes the outlet end $42_o$ of the first stage shroud 42 such that the shrouds 42, 48, in combination, provide a continuum of structure for occluding the underlying exhaust nozzles 24, 28.

The adjoined lobes 30 of the second stage exhaust nozzle 28 incorporate various inventive teachings which ameliorate the fluid dynamics/mixing of the primary and secondary flows PF, $SF_2$ and produce a downstream flow of cooled/suppressed engine exhaust $E_C$. Furthermore, the second stage exhaust nozzle 28 and the adjoined lobes 30 thereof redirect the primary flow PF to prevent impingement thereof on other fuselage structure. Lastly, the second stage exhaust nozzle 28 and the configuration of the adjoined lobes 30 thereof prevent direct line-of-sight viewing into the gas turbine section of the engine 12. These and other features of the second stage exhaust nozzle 28 will be discussed in subsequent paragraphs.

First Stage Exhaust Nozzle

Figure 3A:
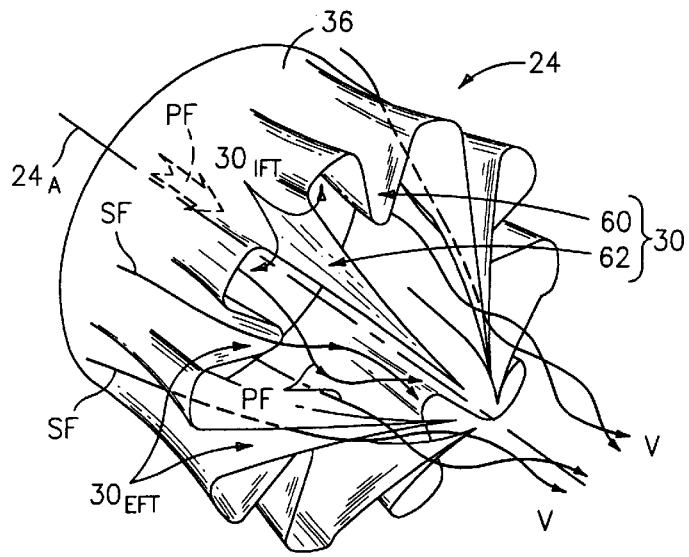
FIG. 3a is an isolated perspective view of the first stage exhaust nozzle having a plurality of adjoined lobes forming an outlet end of the exhaust nozzle, wherein the adjoined lobes further include a first and second plurality of penetrating lobes which are axially staggered relative to each other and wherein at least one of the plurality of penetrating lobes extends into a core region of the exhaust nozzle.
Figure 3B:
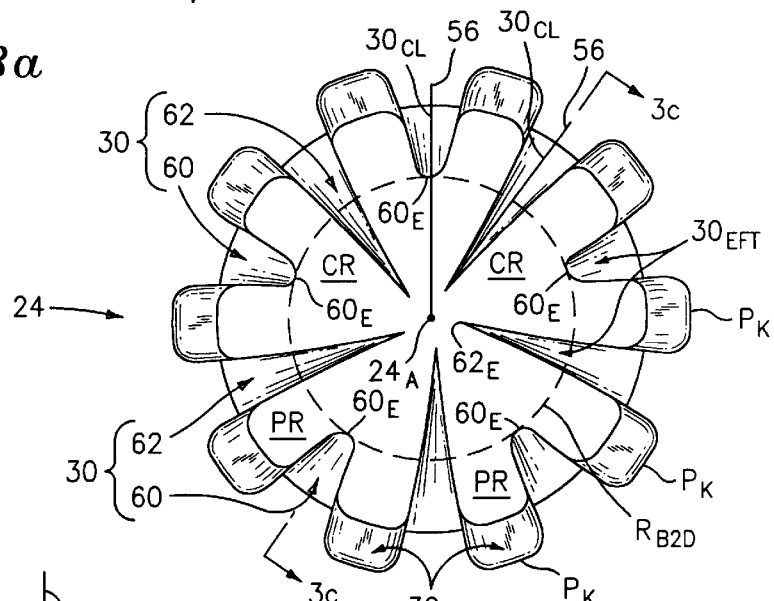
FIG. 3b is an end view of the first stage exhaust nozzle wherein the first and second plurality of penetrating lobes alternate about the periphery of the first stage exhaust nozzle.
Figure 3C:
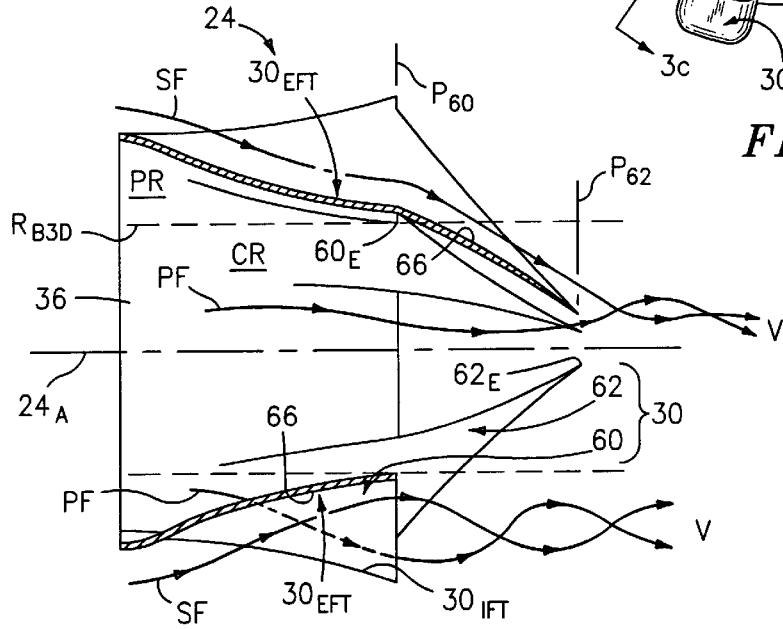
FIG. 3c is a cross-sectional view taken substantially along line 3c—3c of FIG. 3b wherein the first and second plurality of penetrating lobes each terminate at a distinct exit plane.

In FIGS. 3a–3c, various views of the first stage exhaust nozzle 24 are depicted to illustrate the inventive features of the adjoined lobes 30. As shown, the adjoined lobes 30 are integrally formed in combination with the inlet conduit 36 and define an outlet end of the first stage exhaust nozzle 24. In the two-dimensional plane of FIG. 3b, each lobe 30 is defined as extending from peak-to-peak, i.e., between reference points $P_K$, and is substantially radial with respect to a line 56 projecting from a longitudinal axis $24_A$ of the exhaust nozzle 24. In the context used herein, "substantially radial" means that the centerline $30_{CL}$ of each lobe 30 is within about 5 degrees of the angular orientation of such radial line 56. Moreover, each of the adjoined lobes 30 forms an external flow trough $30_{EFT}$ adapted for channeling the secondary flow SF of low temperature gaseous fluid, while adjacent lobes 30 form an internal flow trough $30_{IFT}$ adapted for channeling and diffusing the primary flow PF of high temperature exhaust.

In the exemplary embodiment, the adjoined lobes 30 comprise a first and second plurality of penetrating lobes, 60 and 62, respectively, wherein the first and second plurality of penetrating lobes 60, 62 are axially staggered with respect to each other and wherein at least one of the plurality, 60 or 62, is adapted to extend into a "core region" of the exhaust nozzle 24. Before discussing the functional significance of such lobe configuration it is useful to spatially define the core region as well as to define certain structural and geometric features of the penetrating lobes 60, 62.

The core region of the first stage exhaust nozzle 24 may be spatially defined by a three-dimensional reference boundary which is, in turn, defined by the external flow troughs $30_{EFT}$ of the first plurality of penetrating lobes 60. More specifically, the locus of end points $60_E$ thereof (see FIGS.

3b and 3c) define a two-dimensional reference circle or boundary $R_{B2D}$. By extending the two-dimensional boundary $R_{B2D}$ axially in three-dimensional space, a three dimensional reference boundary $R_{B3D}$ (FIG. 3c) is defined which spatially defines the core region CR of the exhaust nozzle 24. Hereinafter, the core region CR of the exhaust nozzle 24 shall also mean the core region of the primary flow PF of engine exhaust.

In the described embodiment, the second plurality of penetrating lobes 62 extends into the core region CR so as to direct the secondary flow SF of low temperature gaseous fluid deeply into the primary flow PF of engine exhaust (see FIG. 3c). In the preferred embodiment, the end points $62_E$ of the second plurality of penetrating lobes 62 are proximal to the longitudinal axis $24_A$ of the exhaust nozzle 24. Furthermore, the first and second plurality of penetrating lobes 60, 62 are alternately disposed about the periphery of the exhaust nozzle 24 and are equiangularly spaced relative to the longitudinal axis $24_A$.

Additionally, the first and second plurality of penetrating lobes 60, 62 are axially staggered with respect to each other (see FIG. 3c) so as to define at least two exit planes $P_{60}$, $P_{62}$ for diffusing the secondary flow SF. Furthermore, each external flow trough $30_{EFT}$ of the penetrating lobes 60, 62, defines a smooth curve 66 along its axial length, which curve 66 is directed inwardly toward the longitudinal axis $24_A$ of the exhaust nozzle 24. Preferably, the slope of the curve 66 is less than about 30 degrees relative to the longitudinal axis $24_A$ to avoid flow separation, i.e., separation of the secondary flow SF from the surface of the respective external flow trough $30_{EFT}$. Finally, each of the second plurality of penetrating lobes 62 is tapered in radial height and width along its length.

The adjoined lobes 30 of the first stage exhaust nozzle 24 produce axial vortices V which admix the primary and secondary flows PF, SF to effect rapid convective heat transfer therebetween. This mixing principle is generally known in the art and more fully described in Presz, Jr. Et al. U.S. Pat. No. 4,835,961. Improvements thereto, which are the subject of the present invention, relate to modifying the adjoined lobes 30 to axially stagger the penetrating lobes 60, 62, and to cause at least one plurality of lobes 60 or 62 to penetrate into the core region of the primary flow PF. More specifically, the first plurality of penetrating lobes 60 channel the secondary flow SF into a perimeter region PR of the exhaust nozzle 24 (FIGS. 3b and 3c) while the second plurality of penetrating lobes 62 channel the secondary flow SF deeply into the core region CR of the exhaust nozzle 24. As such, the secondary flow SF of low temperature gaseous fluid is channeled into substantially all of the primary flow PF to improve the efficacy of the heat transfer and the degree of IR suppression.

Furthermore, the second plurality or "core" penetrating lobes 62 project axially downstream of the first plurality or "perimeter" penetrating lobes 60 and curve inwardly toward the longitudinal axis $24_A$. As such, the penetrating lobes 60, 62 are axially staggered so as to avoid convergence thereof at the same axial station. Such staggering has the effect of reducing back-pressure by geometrically increasing the flow area at a particular axial station. That is, at the exit plane $P_{60}$ of the perimeter penetrating lobes 60, the entire core region CR is open for unrestricted flow of engine exhaust, while at exit plane $P_{62}$ of the core penetrating lobes 62, the perimeter region PR is essentially open for the flow of engine exhaust.

This may be more fully appreciated by comparing the ejector vane assembly discussed in the Background of the Invention with the penetrating lobes 60, 62 of the present invention. With respect thereto, the ejector vane assembly of the prior art is configured such that each ejector vane directs flow into a core region of the engine exhaust and all the ejector vanes converge at the same axial station. As such, the back-pressure produced by the clustered arrangement of ejector vanes results in significant engine power loss. In contrast, the penetrating lobes 60, 62, of the present invention direct flow into the core region while staggering the exit planes $P_{60}$, $P_{62}$ to facilitate unrestricted flow of engine exhaust.

Second Stage Exhaust Nozzle

Figure 4A:
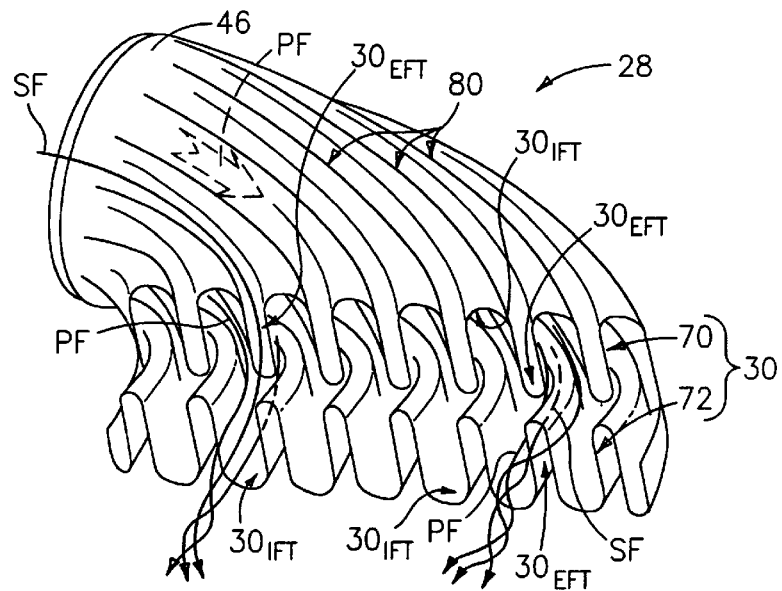
FIG. 4a is an isolated perspective view of the second stage exhaust nozzle having a plurality of adjoined lobes forming an outlet end of the exhaust nozzle, wherein the adjoined lobes further include a first and second plurality of penetrating lobes which are axially staggered relative to each other, and wherein at least one of the plurality of penetrating lobes extends into a core region of the exhaust nozzle.
Figure 4B:
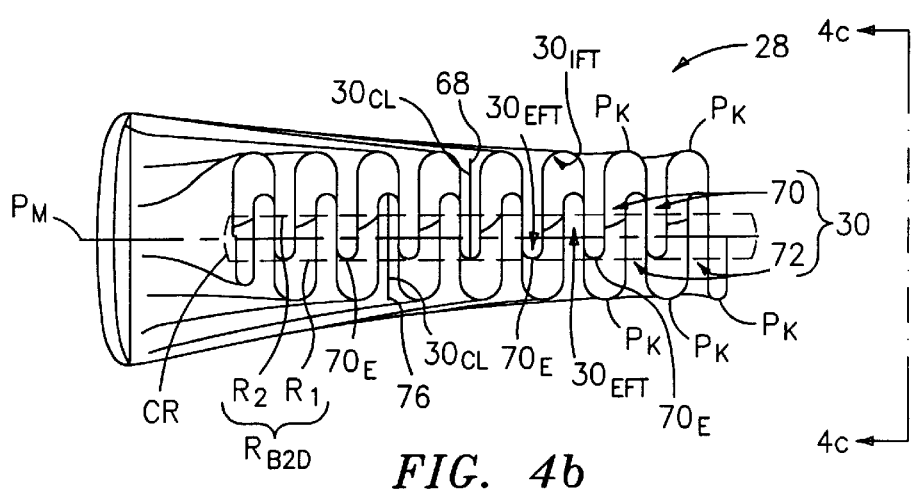
FIG. 4b is an end view of the second stage exhaust nozzle wherein the first and second plurality of penetrating lobes are inset with respect to each other.
Figure 4C:
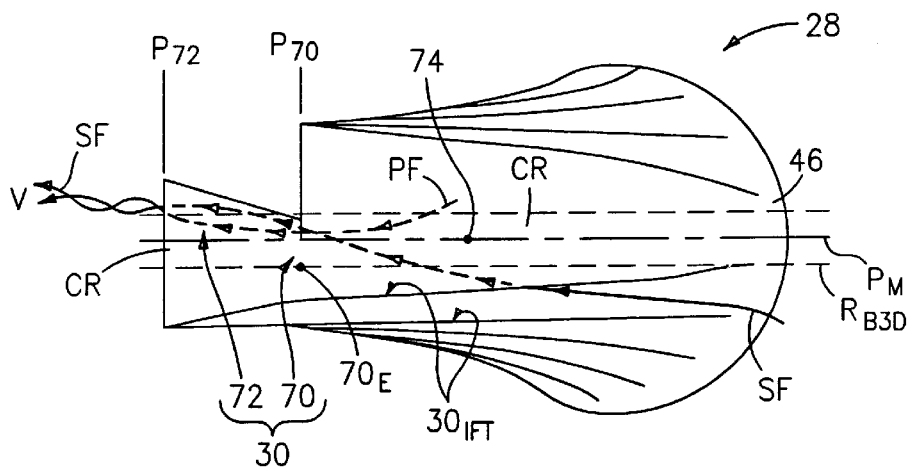
FIG. 4c is a side view taken along line 4c—4c of FIG. 4b wherein the first and second plurality of penetrating lobes each terminate at a distinct exit plane.

In FIGS. 4a–4c, various views of the second stage exhaust nozzle 28 are depicted to illustrate the inventive features of the adjoined lobes 30. As shown, the adjoined lobes 30 are integrally formed in combination with the inlet conduit 46 and define an outlet end of the second stage exhaust nozzle 28. In the two-dimensional plane of FIG. 4b, each lobe 30 is defined as extending from peak-to-peak, i.e., between reference points $P_K$, and is substantially perpendicular with respect to a line 68 projecting from a midplane $P_M$ of the exhaust nozzle 28. In the context used herein "substantially perpendicular" means that the centerline $30_{CL}$ of each lobe 30 is within about 5 degrees of the angular orientation of such perpendicular line 76. Moreover, each of the adjoined lobes 30 forms an external flow trough $30_{EFT}$ adapted for channeling the secondary flow SF of low temperature gaseous fluid (best seen in FIG. 4a), while two adjacent lobes 30 form an internal flow trough $30_{IFT}$ adapted for channeling and diffusing the primary flow PF of partially-cooled exhaust.

In the exemplary embodiment, the adjoined lobes 30 comprise a first and second plurality of penetrating lobes, 70 and 72, respectively, wherein the first and second plurality of penetrating lobes 70, 72 are axially staggered with respect to each other, and wherein at least one of the plurality, 70 or 72, are adapted to extend into a "core region" of the exhaust nozzle 28. In the described embodiment, the core region of the second stage exhaust nozzle 28 may be spatially defined by a three-dimensional reference boundary which is, in turn, defined by the external flow troughs $30_{EFT}$ of the first plurality of penetrating lobes 70. More specifically, the locus of end points $70_E$ thereof (see FIG. 4b) define a first two-dimensional reference curve $R_1$ which, in combination with a second two dimensional reference curve $R_2$ reflectively disposed about the midplane $P_M$, defines a two-dimensional reference boundary $R_{B2D}$. By extending the two-dimensional boundary $R_{B2D}$ axially in three-dimensional space, a three-dimensional reference boundary $R_{B3D}$ is defined (see FIG. 4c) which spatially defines the core region CR of the exhaust nozzle 28. Hereinafter the core region CR of the exhaust nozzle 28 shall also mean the core region of the primary flow of engine exhaust.

Before discussing the functional significance of the lobe configuration and/or the lobe configuration as it relates to the core region of the engine exhaust, it is useful to define certain structural and geometric features of the penetrating lobes 70, 72. More specifically, in the described embodiment, the second plurality of penetrating lobes 72 extend into the core region CR so as to direct the secondary flow SF of low temperature gaseous fluid into the primary flow PF of engine exhaust. In the preferred embodiment, the second plurality of penetrating lobes 72 fully penetrate or traverse the core region CR so as to divide the primary exhaust flow PF into a plurality of discrete flow segments. Furthermore, the first and second plurality of penetrating lobes 70, 72 are axially staggered with respect to each other (see FIG. 3c) so as to define at least two exit planes $P_{70}$, $P_{72}$ for diffusing the secondary flow SF. Moreover, in the preferred embodiment, the second plurality of penetrating lobes 72 are "inset" with respect to the first plurality of penetrating lobes 70 at an axial location corresponding to the exit plane $P_{70}$ and, more preferably, are inset at an axial location 74 inboard of the exit plane $P_{70}$. In the context used herein "inset" means that each external flow trough $30_{EFT}$ of the second plurality of penetrating lobes 72 is aligned with an internal flow trough $30_{IFT}$ of the first plurality of penetrating lobes 70, and crosses the midplane $P_M$ of the exhaust nozzle 28. Also, in the preferred embodiment, the penetrating lobes 70, 72 define a substantially 90 degree bend, which in combination with the inset configuration thereof, define a plurality of turning vanes 80 (see FIG. 4a) for redirecting the primary flow PF.

The adjoined lobes 30 of the second stage exhaust nozzle 28 produce axial vortices V (FIGS. 4a and 4c) which admix the primary and secondary flows PF, SF to effect rapid convective heat transfer therebetween. In addition to this known mixing principle, the inset configuration of the adjoined lobes 30 causes each plurality of penetrating lobes 70, 72 to cross the midplane $P_M$, thereby channeling the secondary flow SF into the core region CR of the exhaust nozzle 28. As such, the secondary flow SF of low temperature gaseous fluid is channeled into substantially all of the primary flow PF to improve the efficacy of the heat transfer and the degree of IR suppression.

In addition, the inset configuration of the penetrating lobes 70, 72 facilitates the formation of turning vanes 80 (FIG. 4a) for directing/redirecting the primary exhaust flow PF. That is, the upper and lower nozzle walls collapse inwardly to form the external flow troughs $30_{EFT}$ while, concomitantly, forming an integral turning duct or vane 80. While the turning vanes 80 serve to direct flow outwardly of the fuselage 22, an equally important function relates to the occlusion of internal components and/or upstream flow from direct-line-of-sight view. That is, the inset configuration of the penetrating lobes 70, 72 in combination with the 90 degree bend of the exhaust nozzle prevents direct line-of-sight viewing into the interior of the second stage exhaust nozzle 28. As such, "hot spots" disposed internally of the exhaust nozzle 28, such as from the gas turbine section of the engine, cannot radiate outwardly so as to become viewable by a heat seeking threat.

Furthermore, the second plurality of penetrating lobes 72 project axially downstream of the first plurality of penetrating lobes 70 for providing both engine performance and IR suppression benefits. More specifically, such staggering has the effect of reducing back-pressure by (i) producing two in-line ejector pumps in series, and (ii) geometrically increasing the flow area at a particular axial station. With regard to the former, the first plurality of penetrating lobes 70 are adapted to entrain the secondary flow SF at exit plane $P_{70}$, and the second plurality of penetrating lobes 72 are adapted to entrain the secondary flow SF at exit plane $P_{72}$. As such, the staggered arrangement produces an additive or compounding effect with respect to pumping efficacy. Accordingly, more cooling air is entrained for suppressing the IR signature of the primary exhaust flow PF, and engine back-pressure is reduced by gains in fluid dynamic pumping. With respect to the latter, the geometrical effect on engine performance may be more fully understood by referring to FIGS. 5a and 5b wherein the flow area of the second stage exhaust nozzle 28 is compared to a Non-Staggered Inset (NSI) lobed nozzle 86. It should be appreciated that such NSI lobed nozzle 86 is not known in the art but is used herein as a baseline for comparison.

Figure 5A:
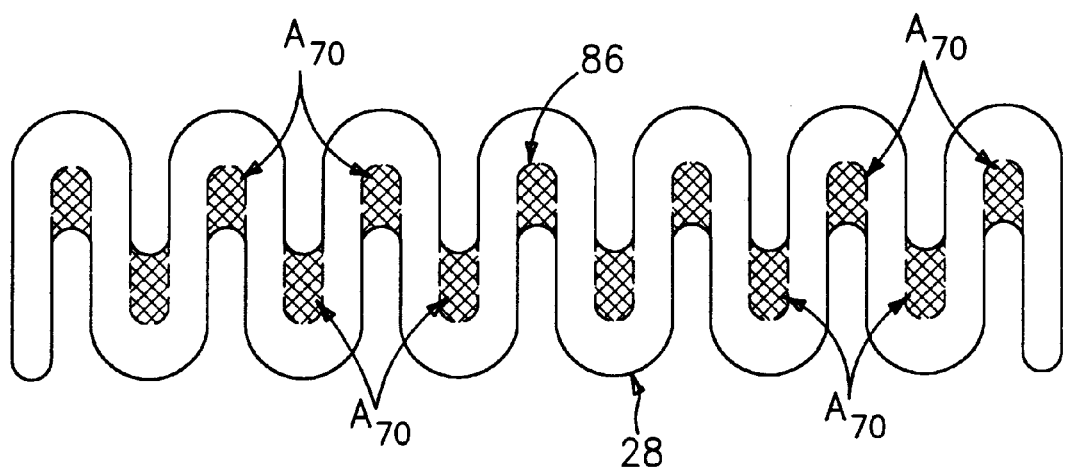
FIGS. 5a and 5b compare a baseline, non-staggered, inset nozzle to the staggered, inset, second stage exhaust nozzle according to the present invention for contrasting the flow areas defined by each nozzle.

In FIG. 5a, the exit plane of the NSI lobed nozzle 86 is overlaid in combination with a section view of the second stage exhaust nozzle 28 at exit plane $P_{70}$. The profile of the NSI nozzle 86 is shown in dashed lines in areas where the NSI nozzle 86 structurally differs from the second stage exhaust nozzle 28 and in solid lines in areas where the nozzles are essentially identical. By examination of the profiles, it will be appreciated that areas $A_{70}$ represent additional flow area for engine exhaust at the exit plane $P_{70}$ of the second stage exhaust nozzle 28.

Figure 5B:
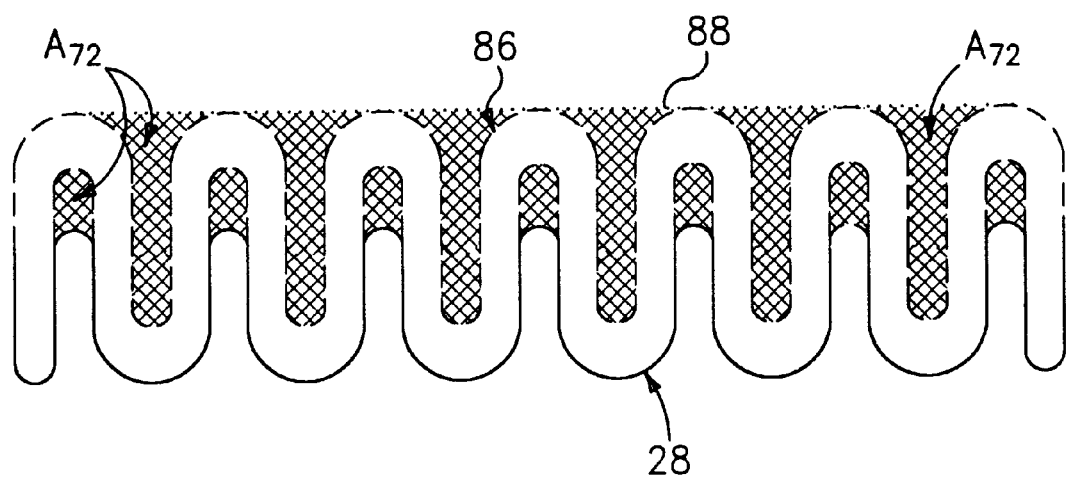

In FIG. 5b, the NSI lobed nozzle 86 is again overlaid in combination with a section view of the second stage exhaust nozzle at exit plane $P_{72}$. The profile of the NSI nozzle is shown in dashed lines in areas where the nozzle 86 structurally differs from the second stage nozzle 28 and a dotted line 88 establishes a minimum upper flow boundary for the second stage nozzle 28. By examination thereof, it will be appreciated, that areas $A_{72}$ represent additional flow area for engine exhaust at the exit plane $P_{72}$ of the second stage exhaust nozzle 28. Accordingly, the total flow area at each of the exit planes $P_{70}$, $P_{72}$ is larger when compared to the baseline NSI lobed nozzle 86, and, as such, the second stage nozzle 28 is less restrictive with respect to the flow of engine exhaust.

Summary and Alternate Embodiments of the Invention

Returning to FIG. 2, the multi-stage mixer/ejector 20 employs various mechanisms, some known in the art and others which are the subject of this invention, to effect significant IR signature reduction while maintaining and/or improving engine performance. Firstly, as is known in the art, each stage of the ejector 20 introduces cooling air $SF_1$, $SF_2$ into the primary exhaust flow PF for reducing engine exhaust temperature. Fluid mixing/pumping is achieved by a venturi effect which relies on the high velocity primary exhaust flow PF to entrain the secondary flows $SF_1$, $SF_2$ of cooling air. As such, the need for additional apparatus to force or pump fluid is eliminated. Furthermore, the shroud means 32 substantially envelops the first and second stage nozzles 24, 28 and, accordingly, serves to occlude the exterior surfaces thereof. Inasmuch as the temperature of such surfaces may be elevated, the shroud means 32 prevents direct viewing of the nozzles 24, 28 and, accordingly, diminishes or eliminates the IR signature radiated from such surfaces.

The staggered configuration of the penetrating lobes 60, 62 or 70, 72 facilitates entrainment of cooling air into the primary exhaust flow PF without degrading engine performance. Firstly, by staggering the lobes 60, 62 or 70, 72, each nozzle 24 or 28 produces two ejector pumps in series, i.e., a first ejector pump at the exit plane $P_{60}$ or $P_{70}$ of the first plurality of penetrating lobes 60 or 70, and a second ejector pump at the exit plane $P_{62}$, $P_{72}$ of the second plurality of penetrating lobes 62, or 72. As such, the fluid dynamic pumping is augmented to (i) entrain more cooling fluid for suppressing the IR signature of the exhaust plume and (ii) reduce back-pressure for improving engine performance. Secondly, by staggering the penetrating lobes 60, 62 or 70, 72, it is possible to situate individual lobes in the core region of the primary flow without creating a restrictive "choke point" at any one axial station or plane. As such, further IR suppression is achievable without degrading performance.

In the described embodiment, each nozzle, 24 or 28, in combination with its respective shroud, 42 or 48, maintains engine performance, collectively, the multi-stage mixer/ejector 20 improves engine performance by about 1–6%. Furthermore, each exhaust nozzle, 24 or 28, in combination with its respective shroud, 42 or 48, is capable of effecting a 30–40% diffusion of IR energy within about two (2) diameters downstream of the nozzle, wherein the diameter is the measured relative to the diameter of the engine exhaust cooling 38. Collectively, the multi-stage mixer/ejector 20 effects an energy reduction on the order of about 60–80% from the high temperature exhaust $E_{HT}$ to the cooled exhaust $E_C$.

While the exhaust nozzles and IR suppressors of the prior art typically require multiple forming and assembly steps, the exhaust nozzles 24, 28 according to the present invention may be formed from conventional low-cost fabrication techniques such as casting or press molding. For example, a highly accurate mold may be fabricated by forming a stereolithography model of the exhaust nozzle, and subsequently, casting a wear and temperature resistance material over the stereolithography model to form a filled casting. The polymer used in the stereolithography process is then removed in a high temperature furnace to form an accurate casting of the exhaust nozzle. Yet another example includes the use of a hydro-forming process wherein a sheet-metal workpiece is fabricated which approximates the size and shape of the nozzle. Hydrostatic pressure is then applied to press-mold the workpiece against an accurate three-dimensional solid model of the nozzle to form the final nozzle configuration. While exhaust nozzles and/or ducts of the prior art typically include individually fabricated and assembled turning vanes for directing exhaust flow, the inset lobe configuration of the second stage exhaust nozzle 28 produces turning vanes 80 as an integral part of the nozzle wall.

Figure 6A:
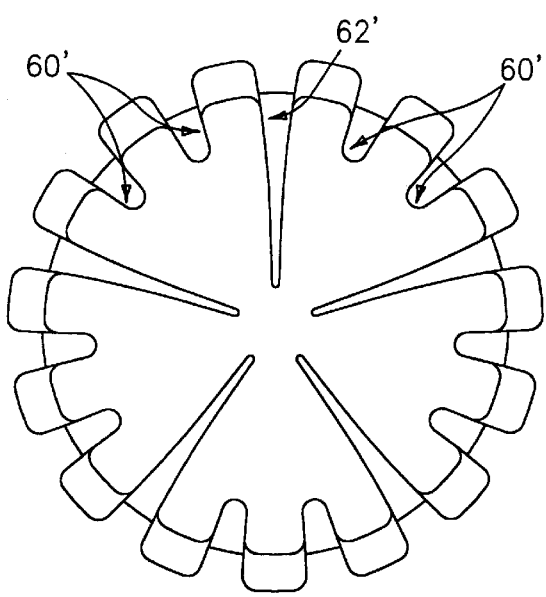
FIG. 6a depicts an alternate embodiment of the first stage exhaust nozzle having an unequal number of perimeter and core penetrating lobes.
Figure 6B:
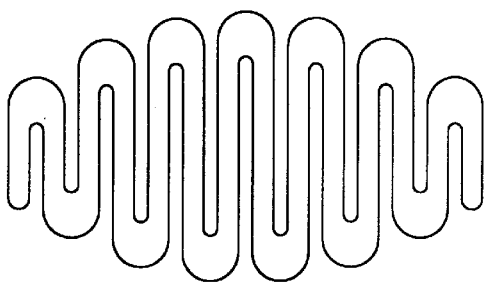
FIG. 6b depicts an alternate embodiment of the second stage exhaust nozzle wherein the outlet end thereof defines a substantially elliptical geometric profile.
Figure 6C:
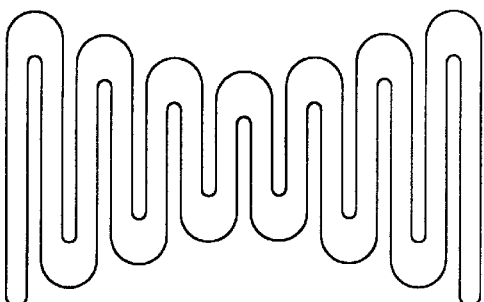
FIG. 6c depicts an alternate embodiment of the second stage exhaust nozzle wherein the outlet end thereof defines a substantially hour-glass shape.
Figure 6D:
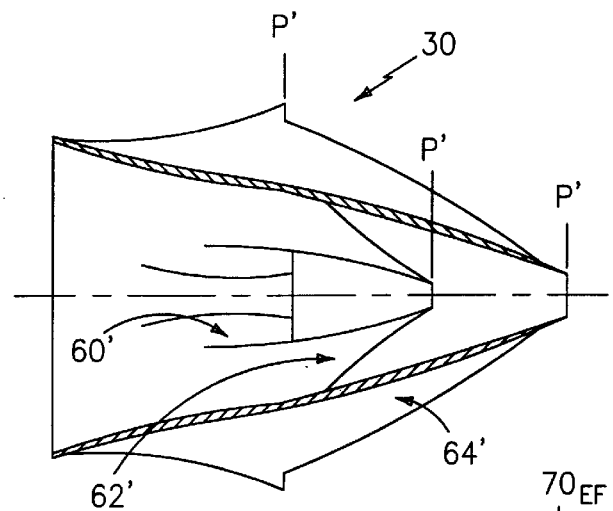
FIG. 6d depicts an alternate embodiment of the first stage exhaust nozzle wherein the adjoined lobes include a first, second and third plurality of penetrating lobes and wherein each plurality of penetrating lobes terminate at a distinct exit plane.
Figure 6E:
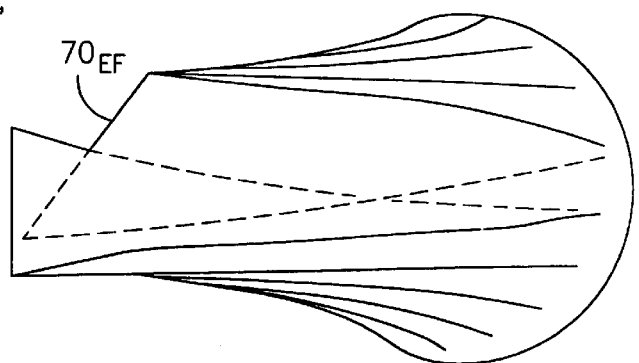
FIG. 6e depicts an alternate embodiment of the second stage exhaust nozzle wherein an end face of the second stage exhaust nozzle is inclined to effect a gradual stagger of the penetrating lobes in an axial direction.

Although the invention has been shown and described with respect to exemplary embodiments thereof, it should be understood by those skilled in the art that other changes, omissions and additions may be made therein and thereto, without departing from the spirit and scope of the present invention. For example, while the first stage exhaust nozzle 24 includes an equal number of alternating perimeter and core penetrating lobes 60, 62, it will be understood that the number of lobes need not be equal nor be alternating with respect to each other. Such configuration is shown in FIG. 6a wherein a core penetrating lobe 62' is disposed between pairs of perimeter penetrating lobes 60'. Furthermore, while the penetrating lobes 60, 62 of the first stage exhaust nozzle 24 are shown to be substantially radial, it should be appreciated that the penetrating lobes could be swirled to effect axial rotation of the exhaust flow. Moreover, while the outlet end of the second stage exhaust nozzle 28 defines a substantially rectangular geometric profile, it will be appreciated that other shapes will accommodate the inset configuration of the penetrating lobes 70, 72. For example, in FIGS. 6b and 6c, the outlet end may define an elliptical geometric profile as shown in FIG. 6b, or an hour-glass shape as depicted in FIG. 6c. In other embodiments of the invention, the adjoined lobes may include additional penetrating lobes to define a third, fourth or higher plurality of penetrating lobes. Such example is depicted in FIG. 6d wherein the adjoined lobes 30 include a first, second and third plurality of penetrating lobes 60', 62', and 64', respectively, and wherein each plurality of penetrating lobes 60', 62', 64' terminate at a distinct exit plane P'. While in the described embodiment, each of the penetrating lobes 70, 72 of the second stage nozzle 28 terminate along a substantially vertical plane, it will be appreciated that the end face $70_{EF}$ may be stepped or inclined so as to effect a gradual stagger of the penetrating lobes in an axial direction.

What is claimed is:

1. An exhaust nozzle (28) operative to suppress the infrared signature radiated from the high-temperature exhaust of an engine (12) including:

an inlet conduit (46) adapted for receiving a primary flow PF of high-temperature engine exhaust;

a plurality of adjoined lobes (30) integrally formed in combination with said inlet conduit (46) and defining an outlet end of the exhaust nozzle (28), each of said adjoined lobes (30) being substantially perpendicular with respect to midplane $P_M$ defined by said outlet end, said adjoined lobes (30), furthermore, being adapted for admixing a secondary flow SF of low-temperature gaseous fluid with said primary flow PF of high-temperature exhaust, said engine exhaust nozzle (28) being further characterized by:

said adjoined lobes (30) defining a first and second plurality of penetrating lobes (70, 72), said penetrating lobes (70, 72) each defining an external flow trough ($30_{EFT}$), said external flow troughs ($30_{EFT}$) of said first plurality (70) defining a core region (CR);

said penetrating lobes (70, 72) furthermore being inset with respect to each other; and said second plurality of penetrating lobes (72) projecting axially downstream of said first plurality of penetrating lobes (70) and extending into said core region (CR) so as to direct the secondary flow SF of low temperature gaseous fluid deeply into the primary flow PF of high temperature engine exhaust.

2. The exhaust nozzle (28) according to claim 1 wherein the exhaust nozzle (28) is also operative to suppress the infrared signature radiated from the hot metal components of the engine (12), and wherein said penetrating lobes (70,72) define a plurality of turning vanes (80) adapted for redirecting the primary exhaust flow PF.

3. The exhaust nozzle (28) according to claim 1 wherein first plurality of penetrating lobes (70) define an exit plane $P_{70}$, and wherein said first and second plurality of penetrating lobes (70, 72) are inset at an axial location (74) inboard of said exit plane ($P_{70}$) for preventing direct line-of-sight viewing into said exhaust nozzle (28).

4. The exhaust nozzle (28) according to claim 1 wherein said inlet conduit (46) defines a substantially circular geometric profile and said penetrating lobes (70, 72) define a substantially rectangular geometric profile.

5. The exhaust nozzle (28) according to claim 1 wherein said second plurality of penetrating lobes define an exit plane $P_{72}$, and wherein said second plurality of penetrating lobes (72) fully traverse said core region (CR) so as to divide the primary flow into a plurality of discrete flow segments.

* * * * *